US006972375B2

(12) United States Patent
Sugaya et al.

(10) Patent No.: US 6,972,375 B2

(45) Date of Patent: Dec. 6, 2005

(54) WIRING HARNESS

(75) Inventors: Masahiko Sugaya, Anjo (JP); Nobukazu Kuribayashi, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/686,117

(22) Filed: Oct. 15, 2003

(65) Prior Publication Data

US 2004/0074665 A1 Apr. 22, 2004

(30) Foreign Application Priority Data

Oct. 21, 2002 (JP) ............................ 2002-305865
Dec. 13, 2002 (JP) ............................ 2002-361735

(51) Int. Cl.[7] ................................................ H02G 1/00

(52) U.S. Cl. ................ 174/117 F; 174/100; 174/72 A; 439/404

(58) Field of Search ............................ 174/72 A, 100, 174/117 F; 439/404, 395, 443, 405, 67, 422

(56) References Cited

U.S. PATENT DOCUMENTS

| | | | | |
|---|---|---|---|---|
| 3,214,723 A | | 10/1965 | Dupre et al. | |
| 3,355,099 A | | 11/1967 | Whippo et al. | |
| 3,355,699 A | | 11/1967 | Oshva | |
| 3,848,946 A | | 11/1974 | Halley et al. | |
| 3,920,301 A | * | 11/1975 | Roberts et al. | 439/398 |
| 4,373,765 A | | 2/1983 | Ritter | |
| 4,718,859 A | | 1/1988 | Gardner | |
| 5,064,382 A | | 11/1991 | Minnis | |
| 5,324,203 A | | 6/1994 | Sano et al. | |
| 5,344,332 A | | 9/1994 | Lopez et al. | |
| 5,803,355 A | | 9/1998 | Ureshino et al. | |

FOREIGN PATENT DOCUMENTS

| | | | |
|---|---|---|---|
| JP | 57-157020 | * | 3/1956 |
| JP | 1-177813 | * | 12/1989 |
| JP | 2002-109976 | | 4/2002 |
| JP | 2002-208325 | | 7/2002 |
| JP | 2002-246090 | * | 8/2002 |
| JP | 2004-180486 | * | 6/2004 |

OTHER PUBLICATIONS

Search/Examination Report dated Dec. 10, 2003 and citations in the corresponding EP application No. 03 02 3847.

* cited by examiner

*Primary Examiner*—Dean A. Reichard
*Assistant Examiner*—Jinhee Lee
(74) *Attorney, Agent, or Firm*—Harness, Dickey & Pierce, PLC

(57) ABSTRACT

A wiring harness for connecting electrically between in-vehicle units includes a pitch ribbon cable having a plurality of bridge portions and a connector having a boss and a press-contact portion. Each bridge portion includes first, second and third notches. The third notch is engaged to another boss of the in-vehicle unit in case of assembling the pitch ribbon cable to the in-vehicle unit so that layout of the wiring harness becomes definite. The second notch is engaged to the boss of the connector in case of attaching the pitch ribbon cable to the connector. The first notch is engaged to the press-contact portion of the connector with using the second notch as a positioning reference so that positioning of the pitch ribbon cable becomes definite.

15 Claims, 4 Drawing Sheets

WIRING HARNESS

CROSS REFERENCE TO RELATED APPLICATION

This application is based on Japanese Patent Applications No. 2002-305865 filed on Oct. 21, 2002, and No. 2002-361735 filed on Dec. 13, 2002, the disclosures of which are incorporated herein by reference.

FIELD OF THE INVENTION

The present invention relates to a wiring harness for connecting between electric units with using a pitch ribbon cable. Specifically, the wiring harness is suitably used for a vehicle.

BACKGROUND OF THE INVENTION

Previously, a wiring harness for connecting between in-vehicle units has a marking tape disposed at a predetermined position of the wiring harness. This wiring harness is disclosed, for example, in Japanese Patent No. 2002-109976. The marking tape shows both the predetermined position as a press-contact position and a corresponding connector in case of manufacturing the wire harness. The corresponding connector is press-contacted and fixed to a certain wire of the wiring harness at the predetermined position. In other words, the marking tape provides to confirm the wire for connecting the corresponding connector among a plurality of wires in the wiring harness.

If a layout of the wiring harness connecting to an in-vehicle unit or a body of a vehicle is indefinite when the wiring harness is arranged in a predetermined position, alignment accuracy of the connector for connecting to the in-vehicle unit or the body becomes lower. Therefore, in a case where spacing between connectors is comparatively narrow, each connector cannot be installed in the in-vehicle unit or the body. On the other hand, in a case where spacing between connectors is comparatively wide, each connector has an excess allowance so that the wiring harness may loosen. This loose of the wiring harness may cause a striking noise or some kind of trouble. Here, the striking noise at a loose portion is generated by bumping between the connector and the wiring harness because of a vibration of the body of the vehicle. The trouble is, for example, a breaking of wire by getting the wiring harness caught in a movable portion of the in-vehicle unit.

Thus, the prior art provides to show the press-contact position between the certain wire and the corresponding connector definitely in case of manufacturing the wiring harness. However, the layout of the wiring harness connecting to the in-vehicle unit or the body of the vehicle remains indefinite, when the wiring harness is arranged in the predetermined position in case of assembling the wiring harness to the in-vehicle unit and the body of the vehicle including another connector.

SUMMARY OF THE INVENTION

In view of the above problem, it is an object of the present invention to provide a wiring harness having accuracy of layout in case of assembling the wiring harness to an in-vehicle unit or a body of a vehicle. It is another object of the present invention to provide a wiring harness having an excellent insulation performance.

A wiring harness for connecting electrically between in-vehicle units includes a pitch ribbon cable having a plurality of bridge portions. Each bridge portion of the pitch ribbon cable includes a plurality of notches for defining a position of the wiring harness.

In the above wiring harness, the notch is disposed in the bridge portion of the pitch ribbon cable, and the notch is used for defining the position of the wiring harness. Thus, the notch provides a definite layout of the wiring harness attaching to the in-vehicle unit.

Preferably, the wiring harness further includes a connector having a press-contact portion for engaging the pitch ribbon cable. Here, the notch includes a first notch, which is penetrated by the press-contact portion of the connector. Therefore, the press-contact portion of the connector can be aligned accurately to the first notch of the pitch ribbon cable.

Preferably, the notch includes a third notch, which engages with a second boss of the in-vehicle unit in case of assembling the wiring harness to the in-vehicle unit. Therefore, the wiring harness itself can be aligned accurately to the in-vehicle unit.

Preferably, each notch disposed in one bridge portion is disposed in a longitudinal direction of the bridge portion at predetermined intervals. Therefore, the wiring harness has a flexibility of alignment, which provides to align the wiring harness accurately even if position of the press-contact portion or the positioning boss change in various ways.

Preferably, the first notch is provided by a precut portion for working as an insulation wall in such a manner that the precut portion arises in a case where the first notch is pressed into the press-contact portion so that the arisen precut portion separates between the press-contact portions. This wiring harness has an excellent insulation performance.

Moreover, another wiring harness for connecting electrically between in-vehicle units includes a pitch ribbon cable having a plurality of bridge portions and a plurality of lead wires and a connector having a first boss and a press-contact portion. Each bridge portion is disposed between two lead wires, and includes first, second and third notches. The third notch is engaged to a second boss of the in-vehicle unit in case of assembling the pitch ribbon cable to the in-vehicle unit so that layout of the wiring harness assembling to the in-vehicle unit becomes definite. The second notch is engaged to the first boss of the connector in case of attaching the pitch ribbon cable to the connector. The first notch is engaged to the press-contact portion of the connector with using the second notch as a positioning reference so that positioning of the pitch ribbon cable attaching to the connector becomes definite.

In the above wiring harness, the third notch provides a definite layout of the wiring harness attaching to the in-vehicle unit. Moreover, the second notch provides a definite positioning of the pitch ribbon cable attaching to the connector.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
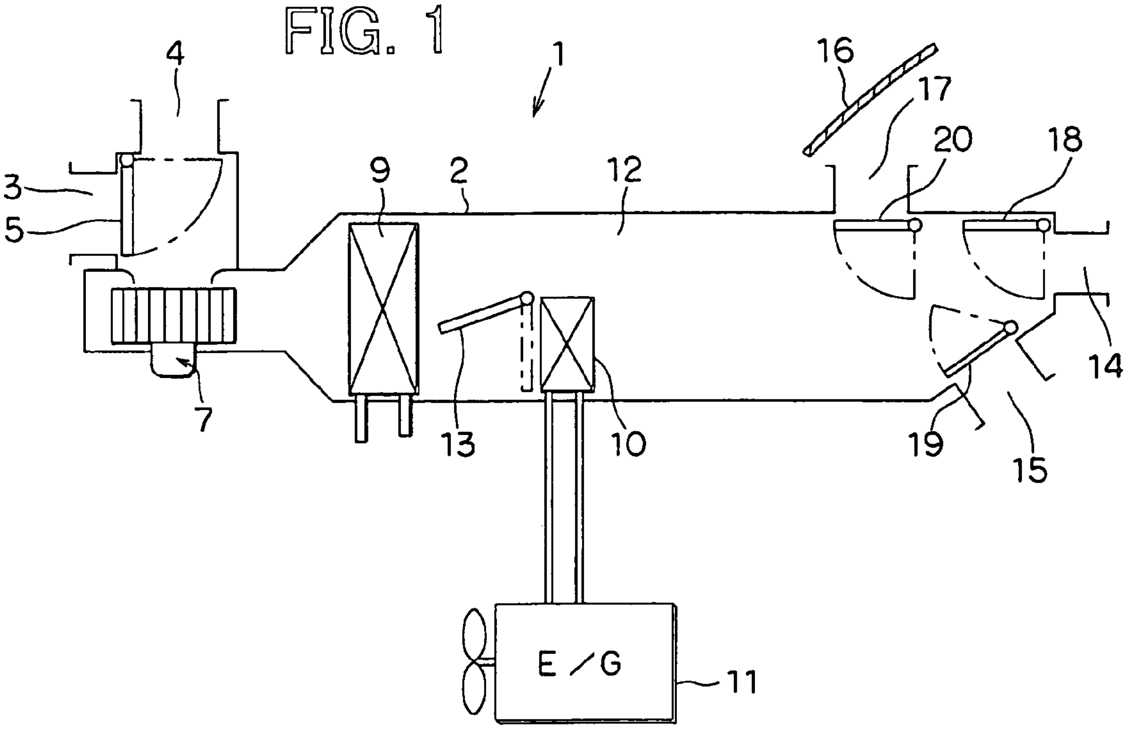
FIG. 1 is a schematic diagram showing an air-conditioner for a vehicle, according to a first embodiment of the present invention.

FIG. 1 is a schematic diagram showing an air-conditioner 1 for a vehicle having a wiring harness according to a first embodiment of the present invention. The air-conditioner has an air-conditioner casing 2 as an air passage. Upstream of the airflow in the air-conditioner casing 2, an inside air suction port 3, an outside air suction port 4, and an inside/outside air-switching door 5 are disposed. The inside air suction port 3 sucks the inside air inside a compartment of the vehicle. The outside sir suction port 4 sucks the outside air outside the compartment. The inside/outside air-switching door 5 selectively opens and closes both the inside and outside air suction ports.

Downstream of the airflow from the inside/outside air-switching door 5, a filter (not shown) and an air blower 7 are disposed. The filter removes a dust in the air. The air blower 7 sucks the air through the inside and outside air suction ports 3, 4. Then, the sucked air is blown to each air blow port 14, 15, 17 by the air blower 7.

Downstream of the airflow from the air blower 7, an evaporator 9 is disposed. The evaporator 9 cools the air blowing into the compartment. All of the air blown by the air blower 7 passes through the evaporator 9. Downstream of the airflow from the evaporator 9, a heater 10 is disposed. The heater 10 heats the air blowing into the compartment with using a water coolant of an engine 11 as a heat source.

In the air-conditioner casing 2, a bypass passage 12 is disposed. The airflow bypasses the heater 10 with using the bypass passage 12. Upstream of the airflow from the heater 10, an air-mixing door 13 is disposed. The air-mixing door 13 controls an airflow ratio between the airflow passing through the heater 10 and the airflow passing through the bypass passage 12 so that the temperature of the air blowing into the compartment is controlled.

On the most downstream of the airflow in the air-conditioner casing 2, a face mode outlet 14, a foot mode outlet 15, and a defroster mode outlet 17 are disposed. The air flows from the face mode outlet 14 toward an upper body of a passenger in the compartment. The air flows from the foot mode outlet 15 toward a lower body of the passenger in the compartment. The air flows from the defroster mode outlet 17 toward a windshield 16 of the vehicle. Each air-blow mode switching door 18, 19, 20 is disposed upstream of the airflow from the outlet 14, 15, 17, respectively.

Figure 2:
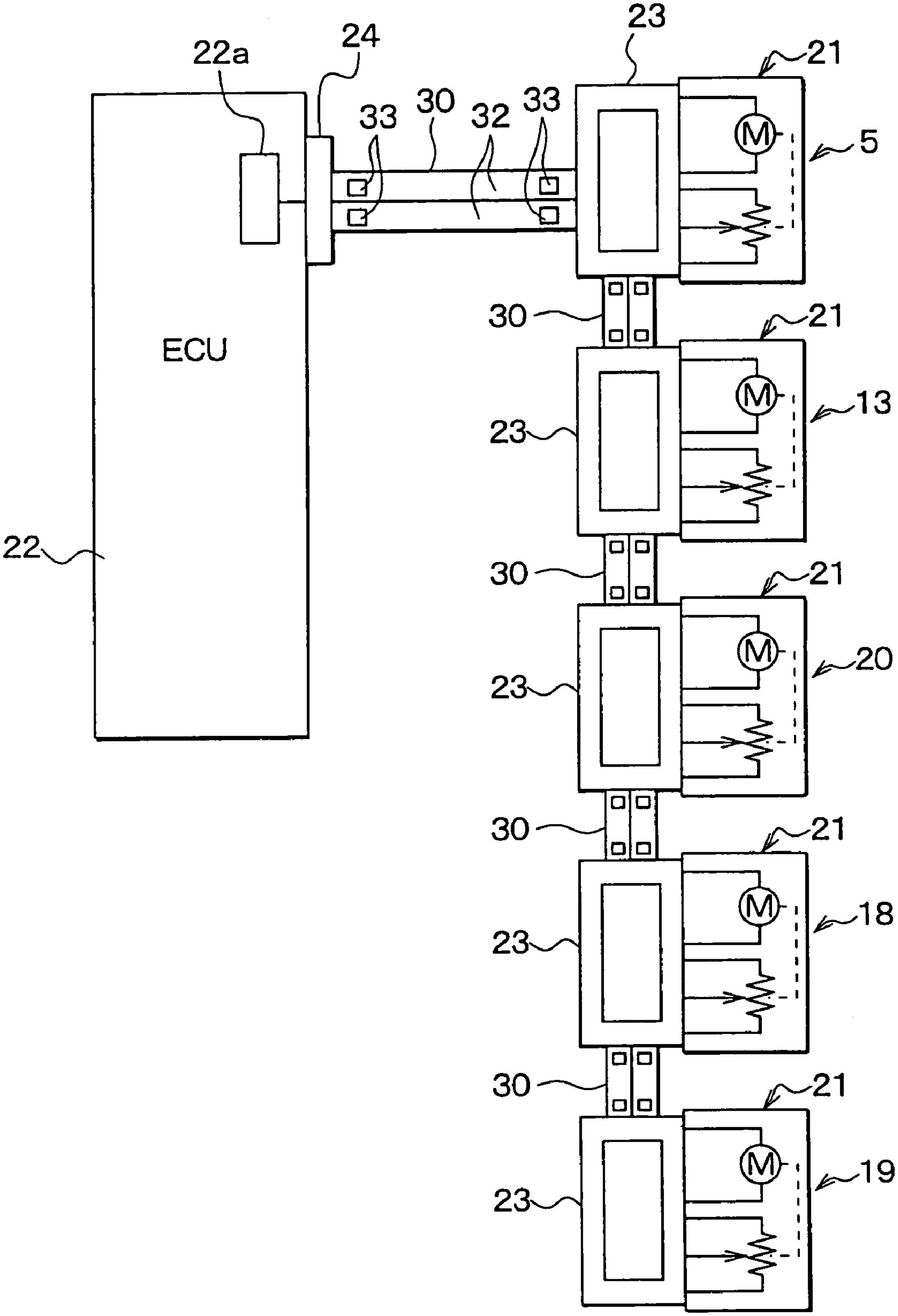
FIG. 2 is a block diagram showing a control system of the air-conditioner, according to the first embodiment.

The air-blow mode switching doors 18, 19, 20, the air-mixing door 13, and the inside/outside air-switching door 5 are opened and closed by each actuator M such as a servomotor, respectively. As shown in FIG. 2, each actuator 21 is controlled by an electric control unit (i.e., ECU) 22. Here, FIG. 2 is a block diagram showing a control system of the air-conditioner.

The ECU 22 includes a communication unit 22*a* connecting to the actuator 21 disposed outside the ECU 22*a*. Specifically, the communication unit 22*a* connects to the actuator 21 through a connector 24 and a pitch ribbon cable 30 as a wiring harness (i.e., a W/H) connected to the connector 24. An actuator connector (i.e., an electronic connector) 23 is disposed on the other end of the pitch ribbon cable 30 opposite to the connector 24. The electronic connector 23 includes an actuator driving unit for driving each actuator such as the inside/outside air switching door 5, the air-mixing door 13, and the air-blow mode switching door 18, 19, 20. Each electronic connector 23 is connected together in series. That is a tandem connection of the electronic connector 23.

Figure 3:
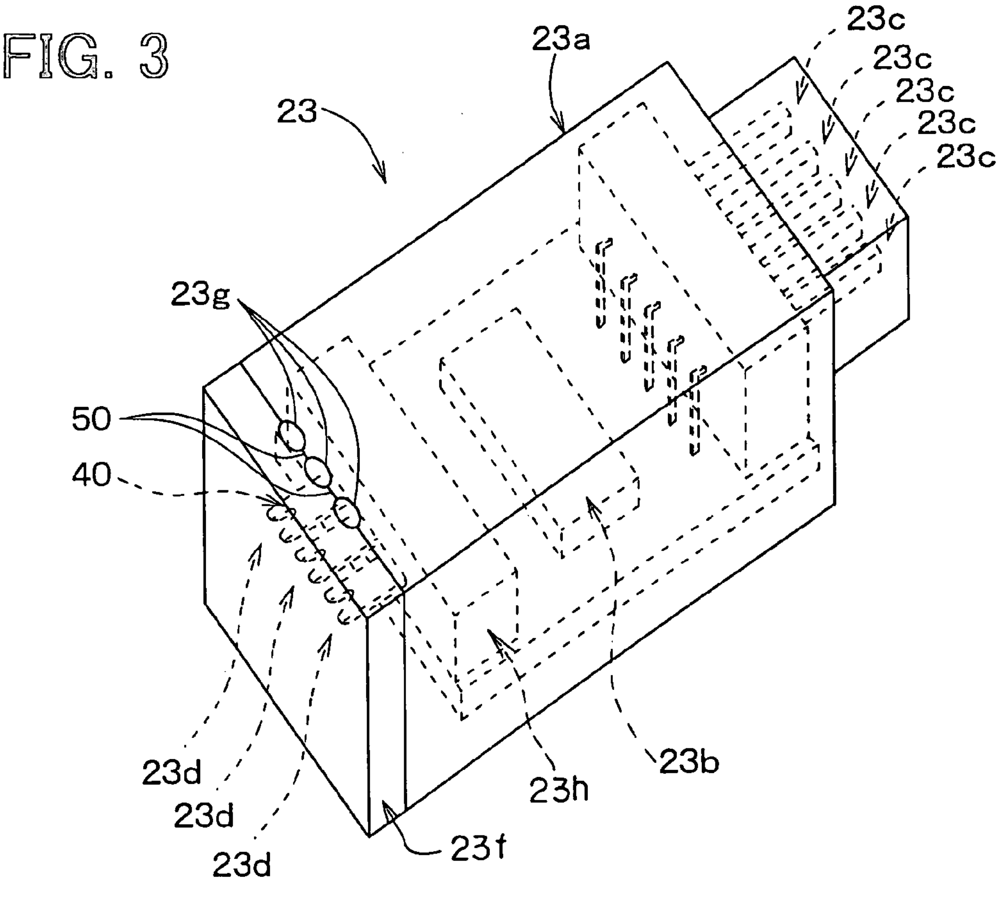
FIG. 3 is a schematic perspective view showing an electronic connector, according to the first embodiment.

FIG. 3 is a schematic perspective view showing the electronic connector 23, which is disposed on the actuator side of the pitch ribbon cable 30 as the W/H for connecting the ECU 22 and the actuator 21. The electronic connector 23 includes a connector housing 23*a*, a cover 23*f*, and a female connector 23*c*. The connector housing 23*a* is made of resin, and has a rectangular solid shape. The connector housing 23*a* accommodates an IC (i.e., an integrated circuit) 23*b*, the female connector 23*c*, and a terminal 23*h* having a harness terminal 23*d*. A motor drive circuit and a communication circuit are integrated in the IC 23*b*, i.e., they are packed in one chip. The motor drive circuit drives the actuator (i.e., a motor M). The communication circuit communicates between the motor drive circuit and the ECU 22 with a control signal including an output signal from a potentiometer for controlling the actuator 21. The female connector 23*c* is engaged to a male connector 21*d* of the actuator 21. The harness terminal 23*d* connects to the pitch ribbon cable 30.

Figure 4:
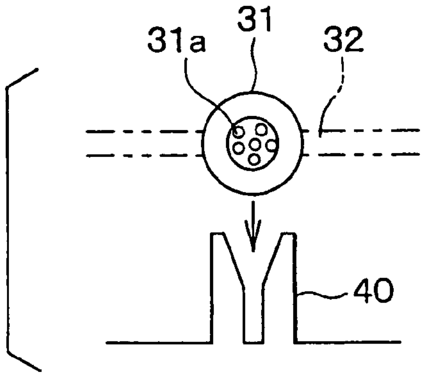
FIG. 4 is a partial cross-sectional view showing a press-contact portion as a crimp-style terminal, according to the first embodiment.

As shown in FIG. 4, on a top end of the harness terminal 23*d*, a press-contact portion 40 is disposed. The press-contact portion 40 as a press-contact terminal has a V shape notch. A coated lead wire 31 of the pitch ribbon cable 30 is inserted in a lead wire opening 23*g* disposed in a contact plane between the connector housing 23*a* and a cover 23*f* so that the lead wire 31 is fixed to the connector housing 23*a*. Moreover, the lead wire 31 is embedded and engaged to the press-contact portion 40 by the cover 23*f* so that the lead wire 31 electrically connects to the harness terminal 23*d*.

In other words, the lead wire 31 of the pitch ribbon cable 30 is embedded in the press-contact portion 40, so that an insulation coat of the lead wire 31 is cut by the press-contact portion 40 having a V-shape. Then, a core wire 31*a* in the lead wire 31 and the harness terminal 23*d* are electrically connected together. On the other hand, the pitch ribbon cable 30 is sandwiched between the connector housing 23*a* and the cover 23*f* through the lead wire opening so that the pitch ribbon cable 30 is fixed to the electronic connector 23.

Thus, the pitch ribbon cable 30 is connected to the electronic connector 30. Similarly, the pitch ribbon cable 30 is also connected to the connector 24. Then, the wiring harness is assembled to the ECU 22, and each actuator in series through the connectors 23, 24, without cutting the bundle of the pitch ribbon cable 30. Here, a portion sandwiched between two lead wire openings 23*g* disposed in the connector housing 23*a* works as a positioning boss 50 described later.

Figure 5A:
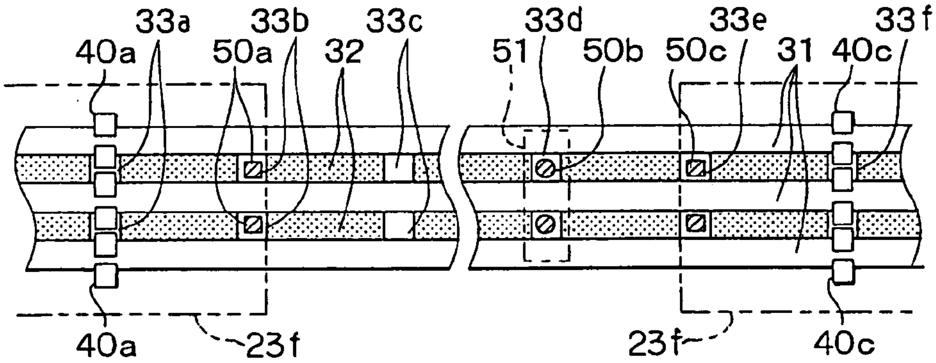
FIG. 5A is a top view, FIG. 5B a cross-sectional view, and FIG. 5C a partial perspective view showing an arrangement of a pitch ribbon cable, according to the first embodiment.
Figure 5B:
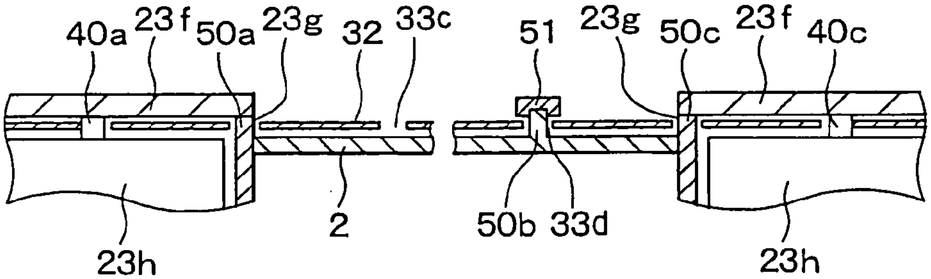
Figure 5C:
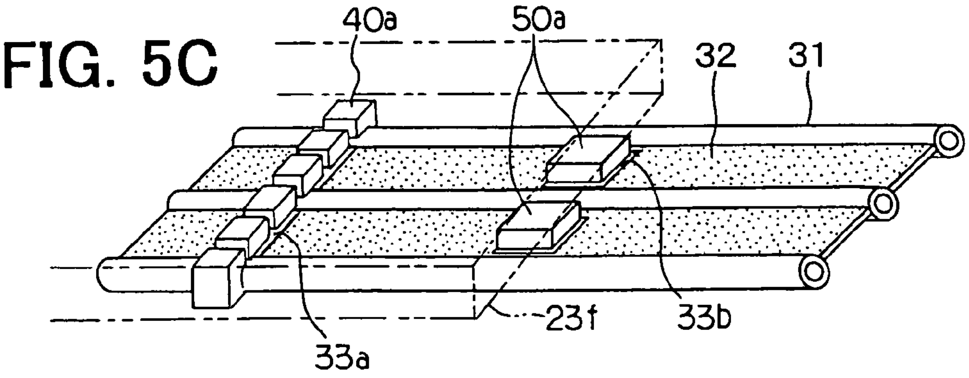

FIG. 5 show an arrangement of the pitch ribbon cable 30. FIG. 5A is a top view showing a part of the pitch ribbon cable 30, FIG. 5B a cross-sectional view, and FIG. 5C a partial perspective view. The pitch ribbon cable 30 includes two power source lines (i.e., a positive line and a ground line) and a control line for transmitting a control signal (i.e., a multiplex communication signal with using a predetermined protocol). In other words, the pitch ribbon cable 30 includes three lead wires 31. A plurality of lead wires 31 forms a bundle of the wire harness such that each lead wire 31 is disposed at every predetermined pitch (e.g., a full pitch equals to 2.54 mm) through a bridge portion 32. The insulation coat of the lead wire 31 and the bridge portion 32 are integrally made of resin material such as vinyl chloride resin.

A plurality of notches 33 is disposed in the bridge portion 32 having a plate shape. A group of notches 33 disposed in adjacent bridge portions of the pitch ribbon cable 30 is disposed in alignment with a line along with a direction perpendicularly to a longitudinal direction of the lead wire 31. In other words, each neighboring notch 33 is disposed perpendicularly to the lead wire 31. The notch 33 is formed by a punching method for punching a hole having a rectangular shape or a round shape. Each notch 33 disposed in one bridge portion 32 is disposed at predetermined intervals in the longitudinal direction of the bridge portion 32, as shown in FIG. 5A.

In the air-conditioner casing 2 of the air-conditioner 1 and the body of the vehicle (not shown), another positioning boss 50*b* is disposed at a predetermined position. In other words, there are two types of the boss 50. One is disposed on the electronic connector 23. For example, positioning bosses 50*a,* 50*c* are disposed on the electronic connector 23. The other is disposed on the in-vehicle unit such as the air-conditioner casing 2 and the body of the vehicle, i.e., the positioning boss 50*b* is the other type of the boss 50. When the W/H is assembled, i.e., attached to the air-conditioner casing 2, the positioning boss 50*b* of the air-conditioner casing 2 penetrates a notch 33*d* disposed in the bridge portion 32 of the pitch ribbon cable 30 so that they are engaged together. In this case, the top end of the positioning boss 50*b* protruded from the notch 33*d* is capped by a boss cap 51, so that both the boss 50*b* and the boss cap 51 are fixed.

Therefore, the W/H is fixed to the air-conditioner casing 2 without loosening, so that positioning accuracy of the pitch ribbon cable 30 is improved. Thus, the W/H has accuracy of layout in case of assembling the W/H to the in-vehicle unit or the body of the vehicle, i.e., the layout of the wiring harness connecting to the in-vehicle unit or the body of the vehicle becomes definite. Moreover, fixation of the pitch ribbon cable 30 is also improved. Although the boss 50*b* has a column shape shown in FIG. 5A, the boss 50*b* can have another shape such as a rectangular solid shape.

Other notches 33*a,* 33*b,* 33*c,* 33*e,* 33*f* are also formed in the bridge portion 32 by punching at predetermined intervals. A positioning boss 50*a,* 50*c* of the connector 23 penetrates a notch 33*b,* 33*e* of the pitch ribbon cable 30 corresponding to the boss 50*a,* 50*c,* respectively. The boss 50*a,* 50*c* is also capped by the cover 23*f,* so that the pitch ribbon cable 30 is fixed to the electronic connector 23. Simultaneously, as described before, a press-contact portion 40*a,* 40*c* of the electronic connector 23 penetrates a corresponding notch 33*a,* 33*f* of the pitch ribbon cable 30, so that the electronic connector 23 connects to the pitch ribbon cable 23 electrically.

Thus, the alignment between the press-contact portion 40*a,* 40*c* and the notch 33*a,* 33*f* can be confirmed, so that the electronic connector 23 is press-contacted and fixed to the pitch ribbon cable 30 at the predetermined position. In other words, the press-contact position between the lead wire 31 and the corresponding electronic connector 23 becomes definite in case of connecting the pitch ribbon cable 30 and the electronic connector 23. Therefore, the notch 33*a,* 33*f* works as a positioning reference for aligning the notch 33*a,* 33*f* to the press-contact portion 40*a,* 40*c,* so that the press-contact position can be confirmed to align at a predetermined position in the pitch ribbon cable 30.

In the W/H according to this embodiment, in a case where the W/H is assembled to the body of the vehicle or the in-vehicle unit such as the air-conditioner casing 2, firstly the notch 33*d,* which is selected among a plurality of the notches 33 disposed in the bridge 32 of the pitch ribbon cable 30, is engaged to the boss 50*b* disposed in the air-conditioner casing 2 or the body of the vehicle, so that the W/H is aligned, i.e., attached to the in-vehicle unit and fixed thereto. Although the selected notch 33*d* is only one notch in this embodiment, a plurality of notches can be selected for being engaged to a plurality of corresponding bosses.

After the fixation of the selected notch 33*d,* the press-contact portions 40*a,* 40*c* of the electronic connector 23 are aligned at a predetermined position of the pitch ribbon cable 30. In this case, the engagement position between the positioning bosses 50*a,* 50*c* and the notches 33*b,* 33*e* works as a positioning reference. Here, the positioning bosses 50*a,* 50*c* are disposed in the electronic connector 23. Accordingly, the pitch ribbon cable can be assembled to the electronic connector 23 without being loosened. Moreover, the W/H can be aligned without bumping against another movable part. Therefore, a breaking of wire in the W/H and a striking noise are limited to generate.

In this embodiment, the pitch ribbon cable 30 is firstly fixed to the in-vehicle unit or the body of the vehicle, and then the pitch ribbon cable 30 is engaged to the electronic connector 23, so that the W/H is assembled and aligned. However, the pitch ribbon cable 30 can be firstly engaged to the electronic connector 23, and then the pitch ribbon cable 30 is fixed to the in-vehicle unit or the body of the vehicle, so that the W/H is assembled and aligned.

Here, in a case where the in-vehicle unit is checked up or repaired, the pitch ribbon cable 30 necessitates to disconnect to the press-contact portion 40 such as the electronic connector 23. In this case, it is preferable not to reuse the pitch ribbon cable 30 so as to align the same portion of the pitch ribbon cable 30 to the press-contact position again, because a loose connection or a disconnection of the lead wire may occur.

Therefore, a newly selected notch, which is neighboring to the previously selected notch 33*d* and has not been used previously, is engaged to the positioning boss. The newly selected notch is selected among a plurality of notches disposed in the pitch ribbon cable 30 at predetermined intervals. Thus, the new positioning reference of the boss is provided, so that the press-contact portion is also newly provided, i.e., the new press-contact portion is not a previous one. Thus, a loose connection at the press-contact portion or a disconnection of the lead wire can be limited.

Although the pitch ribbon cable 30 as the W/H is used for the air conditioner 1 of the vehicle, the pitch ribbon cable 30 can be used for another in-vehicle unit such as a power window actuator for opening and closing a door window glass. Here, the power window actuator is disposed in a door.

Although the notch 33 disposed in the bridge 32 has a rectangular solid shape, the notch 33 can have another shape such as a round shape.

(Second Embodiment)

Figure 6:
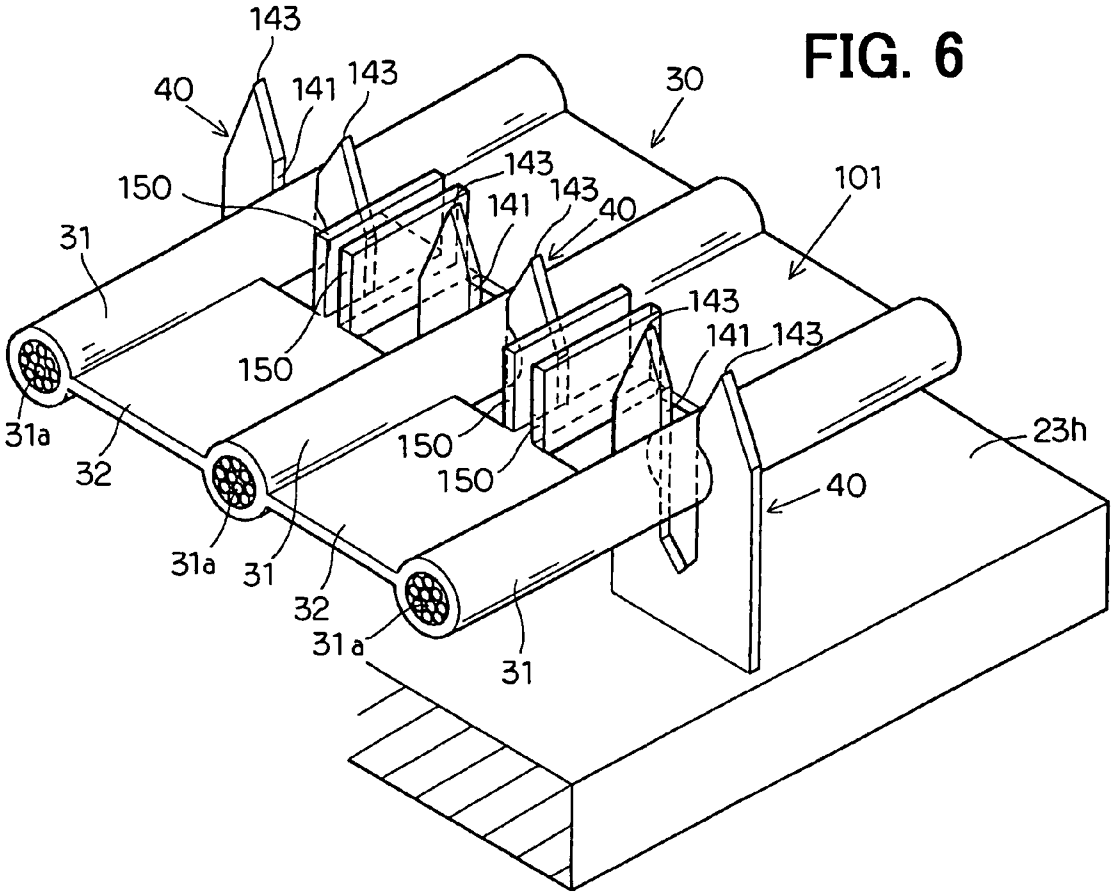
FIG. 6 is a schematic perspective view showing a press-contact portion between a pitch ribbon cable and a terminal, according to a second embodiment of the present invention.
Figure 7:
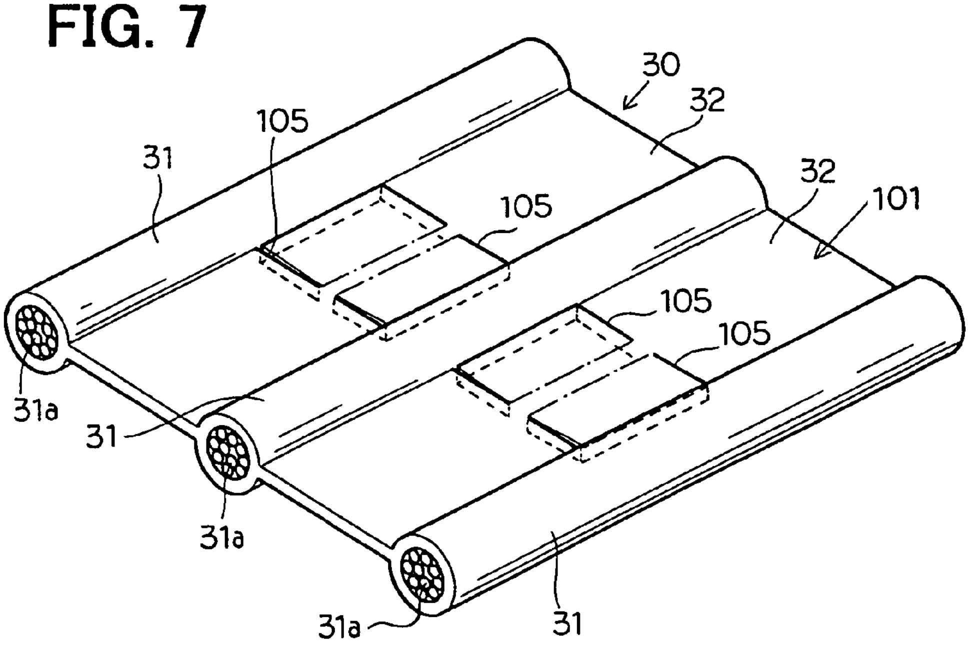
FIG. 7 is a perspective view showing the pitch ribbon cable, according to the second embodiment.

A wiring harness according to a second embodiment of the present invention is shown in FIGS. 6 and 7. The pitch ribbon cable 30 includes a plurality of coated lead wires 31 disposed in parallel and a plurality of bridge portions (i.e., intermediate membranes) 32 formed of a strip-shaped insulation coat 101. Each coated lead wire 31 includes a plurality of wires (i.e., core wires) 31*a* embedded in the insulation coat 101, and has a cylindrical shape. The bridge portion 32 is disposed between the coated lead wires 31, and has a plate shape. The core wire 31*a* is composed of a stranded wire or a single wire, as shown in FIG. 6.

The terminal 23*h* of the electronic connector 23 includes a plurality of press-contact portions 40 disposed in parallel at same intervals as the core wires 31*a*. Each press-contact portion 40 has a press-contact groove 141 on the top end of the press-contact portion 40, and has a furcated shape disposed in parallel to a longitudinal direction of the press-contact portion 40. A pair of pointed tips 143 is disposed on both sides of the press-contact groove 141. The pointed tips 143 easily penetrate the bridge portion 32.

A precut portion 105 is disposed in the bridge portion 32, which is nearby a press-contact position for connecting the pitch ribbon cable 30 and the terminal 23*h*. The precut portion 105 has a pair of horseshoe shape or C-shape precuts, each back of which faces each other so as to sandwich the coated lead wire 31. The precut portion 105 can be a U-shape, an arc shape, and the like.

Here, the precut portion 105 works as the notch 33*a*, 33*f* shown in FIG. 5A, so that the press-contact position can be confirmed to align at a predetermined position in the pitch ribbon cable 30. Accordingly, the press-contact position between the lead wire 31 and the corresponding electronic connector 23 becomes definite in case of connecting the pitch ribbon cable 30 and the electronic connector 23. Therefore, the precut portion 105 instead of the notch 33*a*, 33*f* shown in FIG. 5A works as a positioning reference for aligning the precut portion 105 to the press-contact portion 40, so that the press-contact position can be confirmed to align at a predetermined position in the pitch ribbon cable 30.

The pitch ribbon cable 30 connects to the terminal 23*h* with using with a press-contact method such that the pitch ribbon cable 30 is pressed into a plurality of press-contact portions 40, so that the coated lead wire 31 is pressed into the press-contact groove 141. When the pitch ribbon cable 30 is pressed into the press-contact portion 40, both ends of the coated lead wire 31 are cut by an edge of the press-contact groove 141, so that the core wire 31*a* is connected to the press-contact portion 40 electrically. Simultaneously, the precut portion 105 arises so that a pair of insulation walls 150 is formed between the press-contact portions 40 by the arisen precut portion 105.

Therefore, this W/H provides an excellent insulation performance without any insulation rib disposed between the press-contact portions 40.

Although the precut portion 105 has a pair of horseshoe shape or C-shape precuts, the precut portion 105 can be composed of one horse shape precut and a hole. In this case, the precut portion 105 provides a single insulation wall 150.

Such changes and modifications are to be understood as being within the scope of the present invention as defined by the appended claims.

What is claimed is:

1. A wiring harness for connecting electrically between in-vehicle units, the wiring harness comprising:

a pitch ribbon cable having a plurality of bridge portions; and a connector having a plurality of press-contact portions for engaging the pitch ribbon cable, wherein each bridge portion of the pitch ribbon cable includes a plurality of notches comprising a precut portion for defining a position of the wiring harness, wherein the pitch ribbon cable further includes a plurality of core wires, which are connected to the press-contact portions, respectively, wherein one core wire is disposed between two bridge portions, and wherein one press-contact portion of the press-contact portion is disposed between two notches so that a part of the bridge portion of each of the notches insulates the one press-contact portion.

2. The wiring harness according to claim 1 wherein the plurality of notches include a first notch, wherein the one press-contact portion includes a groove and a pair of tips, wherein the groove is disposed between the pair of the tips, wherein the core wire is disposed in the groove and sandwiched by the pair of the tips so that the core wire is electrically connected to the one press-contact portion, and wherein one of the tips penetrates the first notch so that the part of the bridge portion of the first notch partitions between adjacent press-contact portions of the plurality of press-contact portions.

3. The wiring harness according to claim 2, wherein the plurality of notches include a second notch, which engages with a first boss of the connector in case of attaching the connector to the pitch ribbon cable so that the second notch works as a positioning reference of the press-contact portion, and wherein the first notch is disposed at a predetermined distance from the second notch.

4. The wiring harness according to claim 2, wherein the first notch is provided by the precut portion to work as an insulation wall in such a manner that the precut portion rises when the first notch is pressed into the press-contact portion so that the risen precut portion electrically separates between the adjacent press-contact portions, and wherein the precut portion is disposed in a middle of the pitch ribbon cable in a longitudinal direction of the pitch ribbon cable.

5. The wiring harness according to claim 4, wherein the precut portion has a pair of horseshoe shape, arc shape or C-shape precuts, each back of which faces each other so as to sandwich the adjacent press-contact portion, wherein the one press-contact portion is electrically insulated by two precuts, one of which is provided by the precut portion of the bridge portion, and the other one of which is provided by another precut portion of a neighboring bridge portion.

6. The wiring harness according to claim 5, wherein the core wire has a cylindrical shape, and extends in the longitudinal direction of the pitch ribbon cable.

7. The wiring harness according to claim 1, wherein the plurality of notches include a second notch, which engages with a second boss of the in-vehicle unit in case of assembling the wiring harness to the in-vehicle unit.

8. The wiring harness according to claim 1, wherein each neighboring notch of the plurality of notches disposed in adjacent bridge portions is disposed in alignment with a line perpendicularly to a longitudinal direction of the pitch ribbon cable.

9. The wiring harness according to claim 1, wherein each of the plurality of notches disposed in one bridge portion is disposed in a longitudinal direction of the bridge portion at predetermined intervals.

10. The wiring harness according to claim 1, wherein the pitch ribbon cable connects to an electric circuit disposed in the connector for driving a control actuator with multiplex communication, the actuator controlling a switching door in a vehicle air-conditioner.

11. A wiring harness for connecting electrically between in-vehicle units, the wiring harness comprising:

a pitch ribbon cable having a plurality of bridge portions; and a connector having a plurality of press-contact portions for engaging the pitch ribbon cable, wherein each bridge portion of the pitch ribbon cable includes a plurality of notches comprising a precut portion for defining a position of the wiring harness, the pitch ribbon cable further includes a plurality of core wires, each core wire is connected to a respective press-contact portion, each core wire is disposed adjacent to at least one bridge portion, and each press-contact portion of the plurality of press-contact portions is disposed within at least one notch of the plurality of notches so that a part of the bridge portion forming the at least one notch insulates an adjacent press-contact portion of the plurality of press-contact portions.

12. The wiring harness according to claim 11, wherein:

the at least one notch includes a first notch, the respective press-contact portion includes a groove and a pair of tips, the groove is disposed between the pair of the tips, the core wire is disposed in the groove and sandwiched by the pair of the tips so that the core wire is electrically connected to the respective press-contact portion, and one of the tips penetrates the first notch so that the part of the bridge portion forming the first notch partitions between the respective and the adjacent press-contact portions.

13. The wiring harness according to claim 12, wherein the first notch is provided by the precut portion to work as an insulation wall in such a manner that the precut portion rises when the first notch is pressed into the respective press-contact portion so that the risen precut portion electrically separates between the respective and the adjacent press-contact portions, and the precut portion is disposed in a middle of the pitch ribbon cable in a longitudinal direction of the pitch ribbon cable.

14. The wiring harness according to claim 13, wherein the precut portion has a pair of horseshoe shape, arc shape or C-shape precuts, each back of which faces each other so as to sandwich the respective press-contact portion, wherein the respective press-contact portion is electrically insulated by two precuts, one of which is provided by the precut portion of the bridge portion, and the other one of which is provided by another precut portion of a neighboring bridge portion.

15. The wiring harness according to claim 14, wherein the core wire has a cylindrical shape, and extends in the longitudinal direction of the pitch ribbon cable.

* * * * *